United States Patent [19]

Kemper et al.

[11] 4,144,771

[45] Mar. 20, 1979

[54] VARIABLE STROKE PISTON TYPE ENGINE

[75] Inventors: Yves J. Kemper, Birmingham; Harvey N. Pouliot, Troy, both of Mich.

[73] Assignee: Vadetec Corporation, Troy, Mich.

[21] Appl. No.: 785,662

[22] Filed: Apr. 7, 1977

[51] Int. Cl.[2] .................................... F16H 23/00

[52] U.S. Cl. .................................... 74/60; 123/78 E

[58] Field of Search .................................... 74/60; 123/78

[56] References Cited

U.S. PATENT DOCUMENTS

| | | | |
|---|---|---|---|
| 2,577,675 | 12/1951 | Burkland | 74/60 |
| 2,947,182 | 8/1960 | Wahlmark | 74/60 |
| 2,957,462 | 10/1960 | Clark | 74/60 |
| 3,911,791 | 10/1975 | Clark | 74/60 |

*Primary Examiner*—Benjamin W. Wyche
*Assistant Examiner*—Wesley S. Ratliff, Jr.
*Attorney, Agent, or Firm*—Lane, Aitken & Ziems

[57] ABSTRACT

A piston type energy conversion machine in which the thrust of one or more reciprocating pistons is transmitted to a nutating tubular member having longitudinally spaced journal surfaces of revolution about a nutating axis adjustably inclined with respect to a primary engine axis. The journal surfaces on the nutating member are engaged by a crank member rotatable on the primary engine axis and carrying adjustably eccentric bearings to engage the journal surfaces of the nutating member. Angular adjustment of the axis of nutation effects a variable piston stroke distance as a result of a connection of the pistons to the nutating members at points spaced radially from the nutating axis. Compression ratio is adjusted independently by shifting the point of piston connection with the nutating member along the nutating axis. The nutating member is tubular to establish interior traction surfaces engagable with oppositely converging cone-like surfaces carried by an output shaft so that speed ratio of the output shaft may be varied simultaneously with changes in the angle of nutation and piston stroke length.

17 Claims, 5 Drawing Figures

VARIABLE STROKE PISTON TYPE ENGINE

BACKGROUND OF THE INVENTION

This invention relates to expansible chamber energy conversion machinery and more particularly, it concerns such machinery in which the stroke length of one or more reciprocating pistons is adjustable simultaneously with regulation of the locus of piston reciprocation so that the volumetric ratio of each working chamber may be regulated.

In a commonly assigned co-pending application for U.S. patent application Ser. No. 706,291, filed July 19, 1976 by Yves Jean Kemper, there is disclosed an embodiment of a variable speed transmission or torque variator in which mechanical power developed in one or more reciprocating pistons is transmitted as torque in a rotary output at speeds independent of piston reciprocation frequencies. The thrust of synchronized piston reciprocation in one exemplary embodiment is transmitted to a gimbal or cardan supported nutating member having a pair of rolling surfaces of revolution. An output shaft is coupled with a pair of cone-like members in rolling friction contact with the rolling surfaces on the nutating member. The points of rolling contact are shiftable along the axes of the cone-like members so that output speed is variable in accordance with the ratio of surface radii on the nutating member with those on the cone-like members, the ratio being variable as a result of the different effective radii of the cone-like members. Because of the direct connection of pistons with the nutating member and constant angular relationship between the axis of the nutating member and the axis of the cone-like members, the stroke length of piston reciprocation is also constant in the machines disclosed in this co-pending application.

In a co-pending U.S. patent application, Ser. No. 743,600, filed Nov. 22, 1976 now U.S. Pat. No. 4,100,815 by Yves Jean Kemper and also commonly assigned with the present invention, a variable stroke piston engine is disclosed in which output speed is again variable independently of piston frequency or engine speed by a similar type of torque variator or transmission device. In this instance, the ratio of rolling surface radii or $R_b/R_w$ is varied by adjusting the angle of intersection between the axis of the nutating member, to which the pistons are connected by linkage, and the axis of the cone-like members which, in this instance, are axially slidable toward and away from one another and have rolling surfaces defined by curved generatrices. The nutating member is carried by an external crank-like support rotatable on the axis of the cone-like members, thus necessitating a connection of the pistons with one or both ends of the nutating member. The locus of piston reciprocation is shifted concurrently with piston stroke length in a manner to achieve a constant or near constant compression ratio for all piston stroke lengths.

In a recently filed and commonly assigned co-pending U.S. patent application, Ser. No. 783,776, filed Apr. 1, 1977 now U.S. Pat. No. 4,112,780 by Yves Jean Kemper and Lucien Bigot, a variable speed transmission or torque variator is disclosed in which similar principles of speed ratio variation are used but where an eccentric torque coupling with a tube-like nutating member is effected by a sleeve-like element extending within the nutating member. A gimbal-like system of U-joints is used to restrain the nutating member against rotation on the nutating axis and a pair of adjustable eccentric end journals facilitate regulation of the angle between the nutational axis and the axis of the cone-like members. A rotary torque input resulting in nutation of the tube-like nutating member is transmitted as a variable speed output by adjusting the angle of the nutational axis so that the points of rolling friction contact by nutating member carried surfaces with the surfaces of rotatable cone-like members is adjusted again to vary the ratio $R_b/R_w$.

SUMMARY OF THE PRESENT INVENTION

In accordance with the present invention, an extremely compact, variable stroke, piston engine is provided in which one or more pistons reciprocable in frame carried combustion chambers located symmetrically about a primary or first engine axis are connected to a nutatable tube-like member in a manner to develop a rotary or torque output. Preferably, the nutating member has interior rolling surfaces engaged with exterior rolling surfaces of variable radii provided by cone-like members keyed for rotation with a shaft on the first axis. The nutating member is journalled in eccentric bearings carried on a support rotatable about the first axis and extending inside of the nutating tube. Piston connection with the nutating member is through an exterior sleeve slidable along the axis of the nutating member and carrying radial arms to which the pistons are connected by appropriate piston rods. Control means is provided for adjusting the axial position of the exterior sleeve on the nutating member so that the compression ratio of the pistons may be regulated to accomodate different piston stroke lengths resulting from changes in the angle of the nutating member axis with respect to the primary axis of the engine.

Among the objects of the invention are therefore: the provision of an improved piston-type, expansible chamber, energy conversion machine; the provision of such a machine in which piston stroke length and compression ratio may be simultaneously adjusted; the provision of such a machine in which stroke length and compression ratio may be simultaneously adjusted by independent control means; the provision of such a machine particularly adapted for use as an internal combustion engine; the provision of such an engine in which output speed may be adjusted independently of frequency of piston reciprocation; and the provision of such an engine which is extremely compact.

Other objects and further scope of applicability of the present will be apparent from the detailed description to follow taken in conjunction with the accompanying drawings in which like parts are designated by like reference numerals.

DETAILED DESCRIPTION OF THE PREFERRED EMBODIMENT

Figure 1:
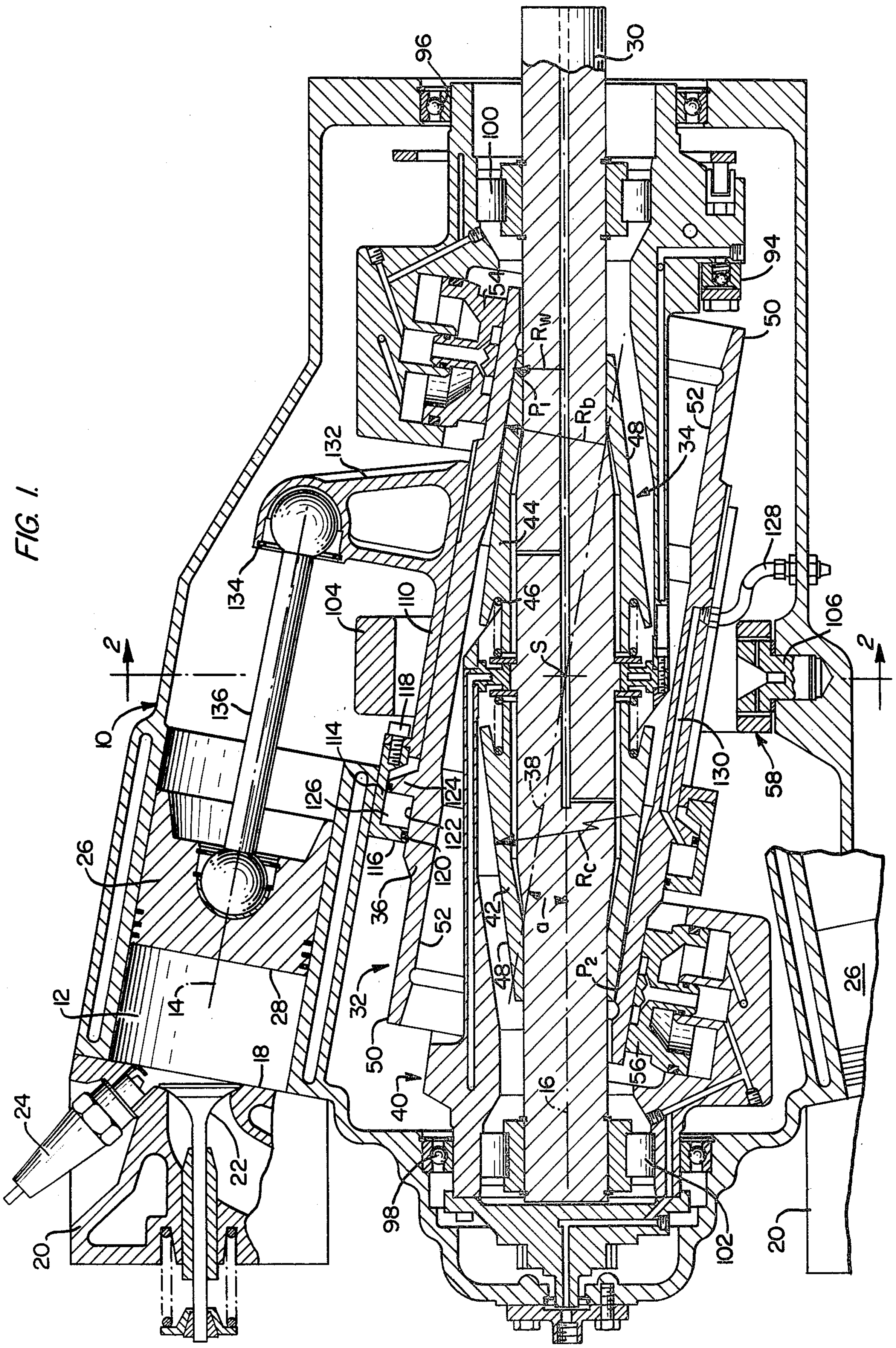
FIG. 1 is a fragmentary longitudinal cross-section through an engine in accordance with the invention (See line 1—1 of FIG. 2)

In FIG. 1 of the drawings, an internal combustion engine is shown to include a frame 10 defining a plurality of cylinders 12 on axes 14 and positioned in symmetrical fashion about a central engine axis 16. The axes 14 of the cylinders 12 are therefore spaced equidistantly from each other and in the disclosed embodiment, are inclined with respect to the axis 16. Although the angle of inclination of the axes 14 and 16 is related to other components of the overall engine to be described in more detail below, it is possible for the cylinder axes 14 to be parallel with the axis 16 or disposed at angles of an inclination other than that shown in the drawings.

Each of the cylinders 12 terminates in an end face 18 defined by a cylinder head 20 in which conventional intake and exhaust valves 22, for example, may be operated between seated or closed and unseated or open conditions by synchronously rotated cams (not shown). Other auxiliary engine components such as a spark plug 24 may be mounted in the cylinder head 20 in accordance with conventional Otto cycle engine operation. Positioned in each cylinder 12 for reciprocation along the respective axes 14 is a piston 26 having an end face 28 defining with the cylinder end face 18 an expansible chamber of a volume which will vary in accordance with the reciprocable stroke distance of piston movement along the axis 14.

The power developed by the expansion of gases in the cylinders 12 and resulting in reciprocation of the pistons 26 is transmitted as torque in a rotary output shaft 30 by way of a torque variator generally designated in FIG. 1 by the reference numeral 32. Although the structural components of the torque variator enabling the transmission of power from the pistons 26 to the output shaft 30 will be described in more detail below, an understanding of this basic function may be gained by noting that the torque variator 32 is comprised of three assemblies which are movable as units or elements; namely, a first rotational element 34 which includes the shaft 30 and which is concentric with the first axis 16, a second nutatable element 36 symmetrically disposed about a second axis 38 inclined with respect to the first axis 16 by an angle a and intersecting the first axis at a point of axes intersection S, and a third element 40 and rotatable on the first axis 16. The third element 40 functions in the manner of an adjustable crank by which the angular disposition of the second axis 38 relative to the first axis 16 is maintained.

As may be observed in FIG. 1, the first element 34 of the torque variator 32 is established additionally by a pair of cone-like members 42 and 44, splined for direct rotation with the shaft 30 and slidable axially thereon in symmetry toward and away from the point S. The members 42 and 44 are biased away from each other in the disclosed embodiment by compression springs 46 though other suitable means such as a hydraulic system or a system of opposed helical splines may be employed to this end. Each of the cone-like members 42 and 44 is identically shaped to define an outer rolling traction surface 48 having a variable radius $R_w$ with respect to the first axis 16. Also, it will be noted that the generatrix of each of the surfaces 48 is a curve having a long radius $R_c$ which is related to minimum (↓) and maximum (↑) values of the radius $R_w$ and the angle a under the equation:

$$R_c = (R_w\uparrow - R_w\downarrow / \text{Cos a}\downarrow - \text{Cos a}\uparrow)$$

The second or nutating element 36 of the torque variator is a tube-like structure having concentric journal and rolling or traction surfaces of revolution about the second axis 38, such surfaces being designated respectively by the reference numerals 50 and 52 in FIG. 1. These surfaces are duplicated on opposite sides of the point of axes intersection S. Also it is to be noted that the rolling or traction surfaces of revolution 52 are of the same radius $R_b$ with respect to the axis 38 and that the surfaces 52 engage the surfaces 48 on the cone-like members 42 and 44 at two points of contact P1 and P2 spaced equally and oppositely from the point S.

The journal surfaces 50 on the second element 36 are rotatably engaged by hydrostatic bearing shoes 54 and 56 carried as a unit with the third or support element 40 in a manner which will be described below. Also, a U-joint or gimbal, generally designated by the reference numeral 58, extends from the frame 10 to the second element 36 to restrain the latter against rotation on the second axis 38 without inhibiting nutation of the member 36 in a manner such that the second axis 38 may travel in a biconical orbit or path about the first axis 16 in symmetry with the point of axes intersection S.

Figure 4:
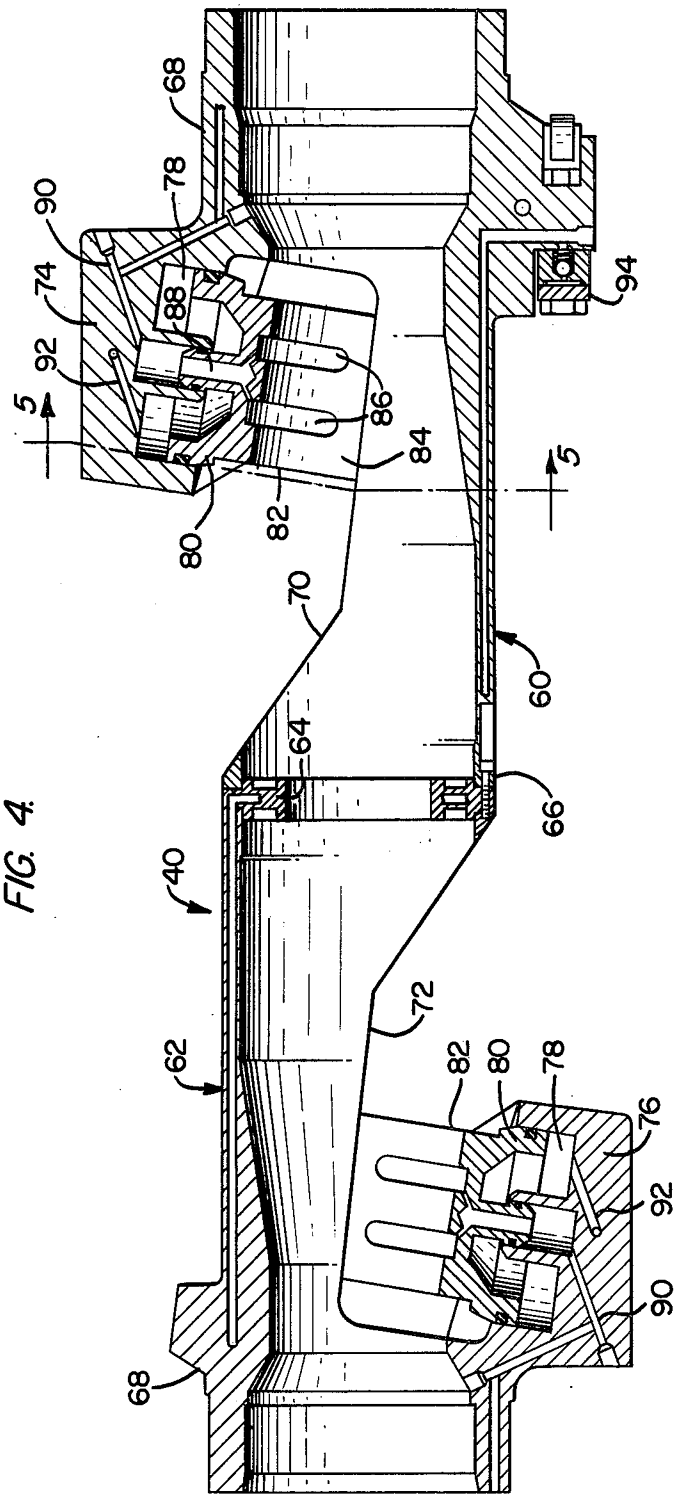
FIG. 4 is a longitudinal cross-section illustrating an additional component incorporated in the engine of FIG. 1.
Figure 5:
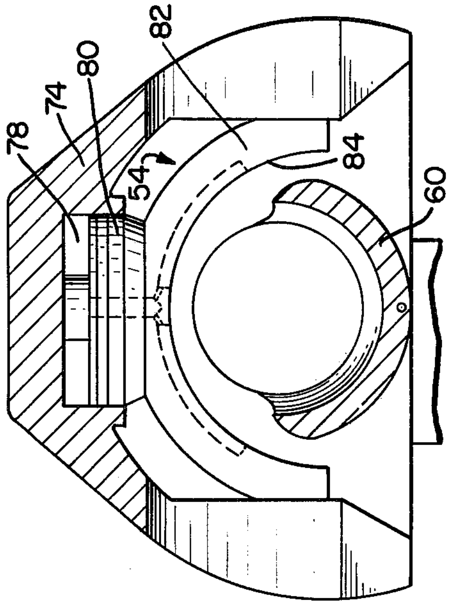
FIG. 5 is a fragmentary cross-section on line 5—5 of FIG. 4.

As shown most clearly in FIGS. 4 and 5, the third element 40 is constituted by a pair of generally similar, longitudinal half-sections 60 and 62 secured in an end-for-end relationship against opposite faces of a connecting ring or collar 64 by a series of axial screw bolts 66 or other equivalent means. Each of the sections extends from the collar 64 as a sleeve-like structure to end bosses 68. An intermediate portion of each section 60 and 62 is cut away to provide diametrically opposite openings 70 and 72 in the assembled element. It will be appreciated that the openings 70 and 72 expose the cone-like members 42 and 44 so that the rolling traction surfaces 48 thereon are presented through the member 40.

The end bosses 68 are shaped to establish inwardly cantilevered shroud portions 74 and 76 which define hydraulic cylinders 78 facing the openings 70 and 72. Movably supported within each of the cylinders 78 is a piston 80 formed integrally with a hydrostatic bearing body 82 having a semi-cylindrical bearing surface 84 to engage the journal surfaces 50 on the nutating second element 36. The surfaces 84 are provided with oil slots 86 to which lubricating oil is fed by way of a nipple 88 in fluid communication with porting 90 provided in the shrouds 74. Additional porting 92 is also formed in each of the shrouds 74 and 76 to supply hydraulic fluid or oil to the cylinder 78 under the control of a pump 94 carried by the element 40. The operation of the pump 94 is described in the afore-mentioned co-pending application, Ser. No. 783,776 filed Apr. 1, 1977 and further discussion thereof is deemed unnecessary herein except to note that the fluid may be introduced into or withdrawn from the cylinders 78 in each of the shrouds 74 and 76 simultaneously to adjust the eccentricity of the bearing bodies 82 and correspondingly the angle a between the axis 38 of the second or nutating member 36 and the first or primary axis 16 of the engine.

As shown in FIG. 1, the third element 40 of the torque variator 32 is supported from the frame 10 for rotation on the axis 16 by bearings 96 and 98. The shaft 30, in turn, is rotatably supported on the same axis from the third element 40 by bearings 100 and 102.

As mentioned above, the tube-like second element 36 of the torque variator 32 is prevented from rotation about the axis 38 by the gimbal-like assembly 58. The assembly 58, as shown most clearly in FIG. 2, includes a ring 104 pivoted by trunnions 106 in the frame 10 on one transverse axis. The tubular member 36 is supported by trunnions 108 from the ring 104 for pivotal movement on another transverse axis perpendicular to the pivotal axis of the trunnions 106. The pivotal axes of the trunnions 106 and 108 intersect the point of axes intersection S. Thus, the member 36 is capable of nutating movement in a manner such that the axis 38 will travel circumferentially about the axis 16 in a generally biconical path.

Slidably supported on the exterior of the second element 36 of the torque variator 32 is a sleeve member 110 having slots 112 to accomodate the trunnions 108. At one end of the member 110, an enlarged ring 114 having an inwardly projecting flange 116 is suitably secured such as by screwbolts 118. A fluid seal 120 is formed on the inner edge of the flange 116 to engage a cylindrical surface 122 delimited by an outwardly projecting annular flange 124 on the member 36. As shown most clearly in FIG. 1, the ring 114 defines with the flange 124 and surfaces 122 an annular chamber 126 to which oil may be supplied by a flexible hose 128 and porting 130 in the tubular member 36. In light of this organization, it will be appreciated that the axial position of the sleeve member 110 relative to the tubular nutating member 36 may be adjusted by the introduction and withdrawal of fluid to and from the annular chamber 126.

Figure 2:
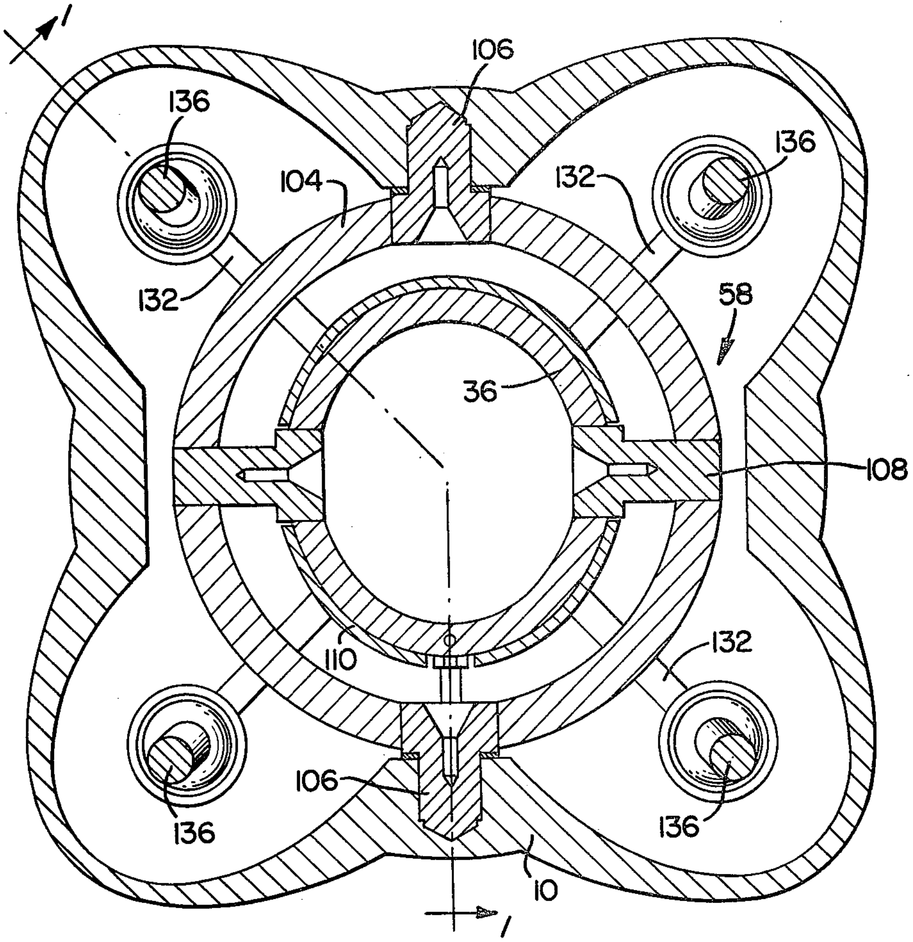
FIG. 2 is a fragmentary cross-section on line 2—2 of FIG. 1.
Figure 3:
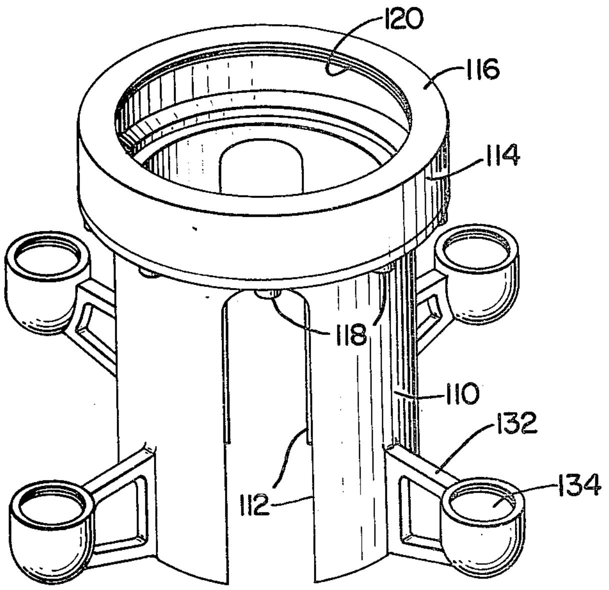
FIG. 3 is a perspective view illustrating a component of the engine illustrated in FIG. 1.

The sleeve-like member 110, as shown most clearly in FIGS. 1-3, is formed with radiating arm-like members 132 supporting semi-spherical sockets 134 at their ends. In the disclosed embodiment, four such arms 132 are provided on the assumption that the disclosed engine will include four cylinders 12. The sockets 134 each engage one end of a piston rod 136 extending to one of the four pistons 26.

In the operation of the engine, the several pistons 26 are sequentially driven through a power stroke by an appropriately timed ignition system including spark plugs 124, for example. The sleeve 110 and nutating member 36 are thus driven to cause the axis 38 to travel in a biconical path about the axis 16. As a result of such nutating movement, the third or crank element 40 will be rotated on the axis 16 at a velocity $\dot{\alpha}$ which corresponds directly to the frequency of piston reciprocation or engine speed. As a result of frictional contact between the rolling surfaces 52 on the nutating tubular member 36 and the surfaces 48 on the cone-like members 42 and 44, the first element 34 of the torue variator 32 and thus the output shaft 30 will be driven at a velocity $\dot{\omega}$ in accordance with the equation $\dot{\omega} = \dot{\alpha}\,(1 - R_b/R_w)$. If it is assumed that the ratio $R_b/R_w$ varies from between 1 and 2, it will be seen that the speed of the shaft 30 may be made to vary from zero to one or from a neutral condition to a condition in which the shaft 30 is driven in unison with the speed of the engine.

Because the function $R_b/R_w$ varies directly with the angle a and also because of the direct connection of the pistons 26 with the nutating tube member 36 through the sleeve member 110, the length of piston stroke will also vary directly with changes in the angle a. Such changes in the piston stroke length are accomodated either with or without change in the compression ratio of the engine by shifting the locus of piston reciprocation relative to the cylinder head end faces 18. This shifting of the locus of piston reciprocation is accomplished by the controlled introduction of fluid to or the withdrawal of fluid from the annular chamber 126 defined by the annular sleeve 110 and the nutating tube-like member 36.

The angle at which the cylinder axes are inclined with respect to the axis 16 is preferably equal to the maximum angle a ↑ contemplated in the design of the engine. In this way, space requirements of the engine are minimized. It will be noted also that the preferred operation of the engine involves the use of the shaft 30 as a source of output torque. It will be appreciated, however, that in situations where the output speed of the engine is correlated directly with the frequency of piston reciprocation, a coupling may be made directly to the third or crank element 40 of the torque variator. In addition, it is contemplated that engine output may be a combination of torque transmitted by the member 40 and through the torque variatior 32 to the shaft 30.

Thus it will be seen that by this invention there is provided an improved expansible chamber energy conversion machine by which the above-mentioned objectives are completely fulfilled. It is also contemplated that various modifications may be made in the embodiment disclosed herein without departure from the inventive concept manifested thereby. Accordingly, it is expressly intended that the foregoing description is illustrative of a preferred embodiment, not limiting, and that the true spirit and scope of the present invention will be determined by reference to the appended claims.

We claim:

1. A piston engine comprising:

a frame;

a first element rotatable on a first axis fixed with respect to said frame;

a tubular second element having concentric rolling and journal surfaces of revolution about a second axis inclined with respect to and intersecting said first axis at a point of axes intersection;

a third element and extending within and throughout the length of said second element, said third element being rotatable on said first axis and having diametrically eccentric bearing members spaced along said second axis on opposite sides of said point of axes intersection, said bearing members engaging said journal surfaces in a plane containing said first and second axes;

at least one fluid working chamber defined by said frame, a piston reciprocable in said working chamber on a third axis spaced from said first axis; and means coupling said piston to said second element, said last mentioned means defining a thrust receiving point of engagement with said piston, said thrust receiving point being spaced from said point of axes intersection.

2. The apparatus recited in claim 1 including means to adjust simultaneously the eccentricity of said bearing members to change the angle of said first and second axes intersection, thereby to change the stroke distance of reciprocation of said piston.

3. The apparatus recited in claim 2 including means to shift said thrust receiving point in a direction parallel to said second axis thereby to change the volumetric ratio of said working chamber upon reciprocation of said piston.

4. The apparatus recited in claim 3 including an arm to establish said thrust receiving point and a sleeve-like member slidable axially on said second member to support said arm.

5. The apparatus recited in claim 4 including means defining an expansible fluid chamber between said second element and said sleeve-like member to control the relative axial positioning of said sleeve-like member and said second element.

6. The apparatus recited in claim 2 wherein said third axis is inclined with respect to said first axis.

7. The apparatus recited in claim 6 wherein the angle of inclination between said first and third axes is equal to the maximum angle of said first and second axes intersection.

8. The apparatus recited in claim 1 including cone-like rolling surfaces on said first element engageable by said rolling surfaces on said second element.

9. The apparatus recited in claim 8 including means to vary the angle of first and second axis intersection to vary the effective radii of said cone-like rolling surfaces at points thereon engaged by the rolling surfaces of said second element.

10. An internal combustion engine comprising:

a frame having a first axis and defining a plurality of combustion chambers located symmetrically about said first axis;

a piston reciprocable in each of said working chambers through a stroke distance determining the compression ratio of each of said chambers respectively;

a tubular nutatable member having a pair of journal surfaces of revolution about a second axis inclined with respect to and intersecting said first axis at a point of axes intersection, said journal surfaces being spaced along said second axis on opposite sides of said point of axes intersection and symmetrical therewith;

a crank element extending throughout the length of said tubular nutatable member and rotatable on said first axis, said crank element having diametrically opposed eccentric bearing members spaced along said second axis on opposite sides of said point of axes intersection and engaging said journal surfaces in a plane containing said first and second axes;

sleeve means slidably mounted on the exterior of said nutatable member and adjustable axially thereof along said second axis; said sleeve means defining thrust receiving points of engagement by said pistons spaced radially from said second axis.

11. The apparatus recited in claim 10 including means to adjust simultaneously the eccentricity of said bearing members to change the angle of said first and second axes intersection to vary the stroke distance of reciprocation of each of said pistons.

12. The apparatus recited in claim 11 wherein said piston is reciprocable on an axis inclined with respect to said first axis by the angle equal to the maximum angle of said first and second axes intersection.

13. The apparatus recited in claim 10 including means to define an expansible fluid chamber between said nutatable member and said sleeve means to control the relative axial positioning of said sleeve means and said nutating member.

14. The apparatus recited in claim 10 including arm members projecting from said sleeve means and piston rods extending between said pistons and said arm members.

15. The apparatus recited in claim 10 including output shaft means rotatable on said first axis and means coupling said output shaft with said nutatable member to enable rotation of said output shaft at speeds independent of the frequency of piston reciprocation.

16. The apparatus recited in claim 10 including means to prevent rotation of said nutating member on said second axis.

17. The apparatus recited in claim 16 wherein said rotation preventing means comprises a ring pivoted from said frame on one transverse axis and means pivotally connecting said ring and said nutating member on another transverse axis, said transverse axes being mutually perpendicular and intersecting said point of axes intersection.

* * * * *